United States Patent [19]

Kaneda

[11] Patent Number: 5,333,707

[45] Date of Patent: Aug. 2, 1994

[54] CONTROLLER FOR RETARDER

[75] Inventor: Naoki Kaneda, Saitama, Japan

[73] Assignee: Akebono Brake Industry Co., Ltd., Tokyo, Japan

[21] Appl. No.: 5,426

[22] Filed: Dec. 18, 1992

Related U.S. Application Data

[63] Continuation of Ser. No. 691,972, Apr. 26, 1991, abandoned.

[30] Foreign Application Priority Data

Apr. 27, 1989 [JP]  Japan .................................. 2-110550

[51] Int. Cl.5 ....................... B60T 10/02; F16D 57/02
[52] U.S. Cl. .................................... 188/296; 188/290; 192/58 R
[58] Field of Search ....................... 188/290, 291, 296; 192/58 R; 60/330

[56] References Cited

U.S. PATENT DOCUMENTS 3,749,209  7/1973  Weinrich et al. ................... 188/291
4,257,504  3/1981  Hanke .

FOREIGN PATENT DOCUMENTS 1029167  5/1966  United Kingdom .
1290611  9/1972  United Kingdom .
1380847  1/1975  United Kingdom ................ 188/296

Primary Examiner—Matthew C. Graham
Attorney, Agent, or Firm—Finnegan, Henderson, Farabow, Garrett & Dunner

[57] ABSTRACT

A controller for a retarder includes: a fluid-storage-type retarder provided to a rotary shaft which is rotated together with the rear wheels of a vehicle, the retarder always storing a fluid; a reservoir tank adapted to be in fluid communication with the retarder; and pressure regulation member adapted to be in atmospheric communication with the reservoir tank for imparting a predetermined restriction to pressurized air which flows into the reservoir tank in accordance with each stationary level of pressure which is produced in the retarder.

6 Claims, 2 Drawing Sheets

CONTROLLER FOR RETARDER

This application is a continuation of 07/691,972, now abandoned.

BACKGROUND OF THE INVENTION

The present invention relates to a controller for a retarder.

A heavy vehicle such as a truck or a bus is provided with a fluid retarder which generates braking torque at the time of a downhill descent of the vehicle. The retarder slows the vehicle from a high speed or the like so as to prevent brake fade due to the rise in the temperature of the brake, to enhance the safety of the vehicle and lengthen the life of the friction material of the brake. As shown in FIG. 3, the conventional fluid retarder includes an impeller 51 secured to a rotary shaft 50 such as a propeller shaft, and a stator 52 secured to the chassis of the vehicle so as to be unrotatable. To put the retarder into action, a working liquid is injected into the retarder through a working liquid inlet port 53 by air pressure. The level of the injected liquid in the retarder is controlled to generate the braking torque whose level corresponds to the injected quantity of the liquid. To put the retarder out of action, the working liquid is discharged from the retarder through a working liquid discharge port 54 by a centrifugal force. As shown in FIG. 4 indicating the characteristic of the rising of the braking torque, it gradually rises along with the injection of the working liquid, then reaches a maximum level, and thereafter remains at a nearly-unchanged higher level "a" or a nearly-unchanged lower level "b".

In the conventional fluid retarder, the level of the braking torque is set by controlling the level of the working liquid between the impeller 51 and the stator 52. Since the level of the braking torque becomes nearly unchanged after reaching the maximum value thereof, at the initial stage of the generation of the torque, there is a problem that it is difficult for the driver of the vehicle to come to know whether the retarder is put in action or not. In other words, since the stationary level of .the braking torque of the fluid retarder is usually lower than the level of the braking torque of the brake, the driver cannot clearly recognize the slowdown of the vehicle if the rate of its deceleration based on the braking torque of the retarder is not high enough. Therefore, the braking operation feeling property of the vehicle is so poor that the driver is likely to unexpectedly depress the pedal of the brake to result in applying excessive braking torque to the vehicle to adversely affect the safety thereof, as the fluid retarder is in action.

SUMMARY OF THE PRESENT INVENTION

The present invention was made in consideration of the above-mentioned problem. Accordingly, it is an object of the invention to provide a controller for retarder which includes: a fluid-storage-type retarder always storing a fluid and attached to a rotary shaft which is rotated together with the rear wheels of a vehicle; a reservoir tank connected to the retarder; and a pressurized air source for supplying pressurized air into the tank so as to control braking torque. The controller is characterized in that at least one pair of pressure control valves are provided so that one of them is optionally connected to the tank through a changeover valve to produce one of two or more stationary levels of pressure in the tank; and the resistance to the flow in each of the pressure control valves is set so that at the initial stage of the generation of the torque by the retarder, pressure higher than the corresponding one of stationary levels of pressure, each of which is produced in the retarder, is produced in the tank for a time whose length corresponds to the corresponding stationary level.

The controller provided in accordance with the present invention functions so that when the pressurized air is introduced from the pressurized air source into the reservoir tank in order to put the fluid-storage-type retarder into action during the movement of the vehicle, the prescribed braking torque whose level corresponds to the pressure of the pressurized air in the reservoir tank is generated by the retarder connected to the tank. At the initial stage of the generation of the braking torque, the torque sharply rises, and takes a maximum level. The cause of the sharp rise in the braking torque is that an incompressible working liquid is always stored in the retarder to sharply increase the pressure therein as soon as the start of the action of the retarder. For that reason, the braking torque, which rises more sharply than that of the conventional fluid retarder of the liquid level control type and takes a level higher than a stationary level, is generated by the fluid-storage-type retarder immediately after the start of the action thereof.

If one of the pressure control valves, which is for producing the relatively-low stationary level of the pressure in the reservoir tank, is optionally connected to the tank through the changeover valve, the braking torque takes the level equal to the stationary level and then takes the maximum level, at the initial stage of the generation of the braking torque, and takes the stationary level a short time after taking the maximum level. The time from the taking of the level equal to the stationary level to the taking of the latter through the taking of the maximum level is a relatively short time which is set in terms of the resistance to the flow in the pressure control valve and corresponds to the relatively-low stationary level of the pressure in the reservoir tank. Because of the relatively short time, the driver of the vehicle can feel the start of the action of the retarder and the generation of the relatively-low stationary level of the braking torque.

If the other pressure control valve for producing the relatively-high stationary level of pressure in the reservoir tank is optionally connected to the tank through the changeover valve, the pressure of the pressurized air introduced into the reservoir tank is regulated by the pressure control valve to cause the fluid-storage-type retarder to generate the braking torque whose level corresponds to the stationary level of the pressure. The braking torque sharply rises, then takes a level equal to a relatively-high stationary level and then takes a maximum level, at the initial stage of the generation of the torque, and takes the relatively-high stationary level a relatively long time after taking the maximum level. The time from the taking of the level equal to the stationary level to the taking of the latter through the taking of the maximum level is a relatively long time which is set in terms of the resistance to the flow in the pressure control valve and corresponds to the relatively-high stationary level of the braking torque. Since the vehicle undergoes a relatively high rate of deceleration due to the relatively long time set in terms of the resistance and corresponding to the relatively-high stationary level, the driver of the vehicle can feel the start of the action of the retarder and the generation of the relatively-high stationary level of the braking torque.

Thus, two or more stationary levels of pressure are produced through the two or more pressure control valves, respectively, and the resistance to the flow in each of the valves is set so that at the initial stage of the generation of the braking torque by the fluid-storage-type retarder, the pressure higher than the corresponding one of the stationary levels of pressure, each of which is produced in the retarder, is produced therein for the time whose length corresponds to the corresponding stationary level. For that reason, the driver of the vehicle can-feel the start of the action of the retarder and the stationary level of the braking torque.

DETAILED DESCRIPTION OF THE PREFERRED EMBODIMENTS

An embodiment of the present invention is hereafter described with reference to the drawings attached hereto.

Figure 1:
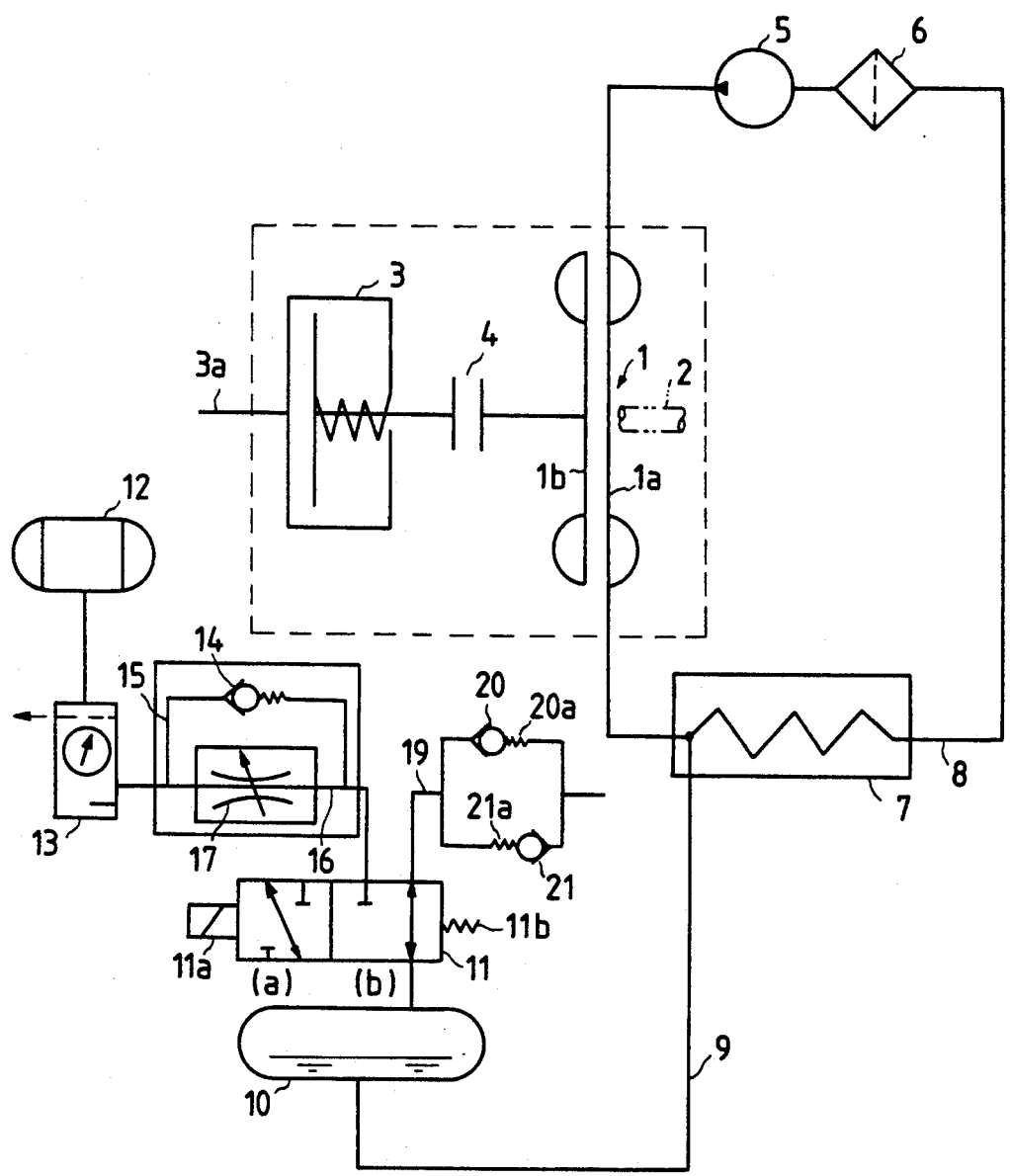
FIG. 1 is a schematic view of a controller which is for a retarder and is an embodiment of the present invention.

FIG. 1 shows a controller which is for the fluid-storage-type retarder 1 of a vehicle and is the embodiment. The retarder 1 is coupled to a rotary shaft 2 such as a propeller shaft, an axle and a shaft in an automatic transmission. The rotary shaft 2 is rotated together with the rear wheels of the vehicle. The retarder 1 includes a stator 1a secured to the chassis of the vehicle so as to be unrotatable, and an impeller 1b capable of being coupled to the rotary shaft 2 so as to be rotatable. A working liquid, which is oil or water, is always stored in between the stator 1 and the impeller 1b. When pressurized air is introduced into an actuator 3 through a pipe 3a, a clutch 4 is engaged so that the impeller 1b is rotated together with the rotary shaft 2 to convert the kinetic energy of the working liquid into thermal energy to generate braking torque. A pump 5 for circulating the working liquid, a filter 6 and a liquid cooler 7 are connected in series to the retarder 1 so that a closed circuit 8 is constituted. A reservoir tank 10 is connected to the circuit 8 through a pipe 9. The working liquid is stored in the lower portion of the reservoir tank 10. Pressurized air is supplied into or discharged from the upper portion of-the tank 10 through a changeover valve 11, which can be put in either of positions (a) and (b). When the solenoid 11a of the valve 11 is energized so that it is put in the position (a), the pressurized air is introduced into the reservoir tank 10 from an air tank 12 through a pipe 15 and a check valve 14 while the pressure of the air is reduced from a level of 4 to 7 kgf/cm² in the air tank to a level of 2 kgf/cm², for example by a pressure regulator 13. A restriction valve 17 is connected to the pipe 15 between the changeover valve 11 and the check valve 14 through a branch pipe 16 so that air is allowed to flow from the reservoir tank 10 to the atmosphere through the restriction valve to control the pressure in the tank to a relatively-high stationary level. When the solenoid 11a is de-energized so that the changeover valve 11 is put in the position (b) by a spring 11b, the reservoir tank 10 communicates with the atmosphere through a pipe 19 and check valves 20 and 21 disposed in parallel with each other. A pressure level of about 1 kgf/cm² is set for the check valve 20 by a spring 20a so that air is allowed to flow from the reservoir tank 10 to the atmosphere through the valve to control the pressure in the tank to a relatively-low stationary level. A pressure level of about 0.1 kgf/cm² is set for the check valve 21 by a spring 21a so that air is allowed to flow from the atmosphere to the reservoir tank 10 through the valve to prevent the pressure in the tank from becoming negative. Either of the check valve 20 and the restriction valve 17, which are a pair of pressure control valves, can be optionally connected to the reservoir tank 10 through the changeover valve 11.

After the pressurized air is introduced from the air tank 12 into the reservoir tank 10 as occasion demands, one of two stationary levels of pressure can be produced in the reservoir tank and the fluid-storage-type retarder 1 through the action of one of the check valve 20 and the restriction valve 17 to cause the retarder to generate one of two stationary levels of braking torque. The check valve 20 and the restriction valve 17 differ from each other in pressure regulation speed so that the spring 20a, which imparts a resistance to the flow in the check valve, is compressed by pressure above the stationary level to relatively rapidly complete the regulation of the pressure, and a restrictor, which imparts a resistance to the flow in the restriction valve, acts to pressure above the stationary level to slowly complete the regulation of the pressure. For that reason, at the initial stage of the generation of the braking torque by the retarder 1, namely, before the torque takes the stationary level, pressure higher than the corresponding one of the two stationary levels is produced in the retarder for a time whose length corresponds to the corresponding stationary level.

The operation of the controller is described more concretely from now on. When a retarder switch not shown in the drawings is turned on during the movement of the vehicle so that the clutch 4 couples the impeller 1b to the rotary shaft 2 being rotated together with the rear wheels of the vehicle and the changeover valve 11 is put in the position (a) by the solenoid 11a. As a result, the pressurized air in the air tank 12, the pressure in which fluctuates, is sent to the reservoir tank 10 through the pipe 15 and the check valve 14 while the pressure of the air is controlled by the pressure regulator 13. The pressurized air sent to the reservoir tank 10 exerts pressure on the working liquid stored in the tank, so that the fluid-storage-type retarder 1 generates the prescribed braking torque whose level corresponds to the pressure of the air, as described again hereinafter.

To cause the retarder 1 to generate the relatively-low stationary level of the braking torque, the changeover valve 11 is put in the position (b) by the spring 11b so that the reservoir tank 10 communicates with the atmosphere through the check valve 20. At that time, since the pressure level of about 1 kgf/cm² is set for the check valve 20 to allow the air flow from the reservoir tank 10 to the atmosphere through the valve, the pressure in the tank is controlled to the stationary level of about 1 kgf/cm² so that the retarder generates the stationary level of the braking torque.

Figure 2:
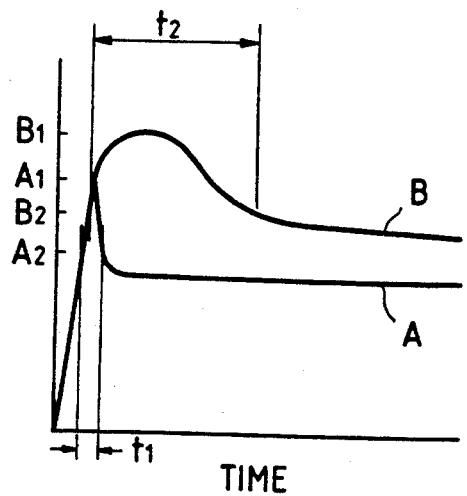
FIG. 2 is a graph showing the relationship between the braking torque generated by the retarder, and time.
Figure 3:
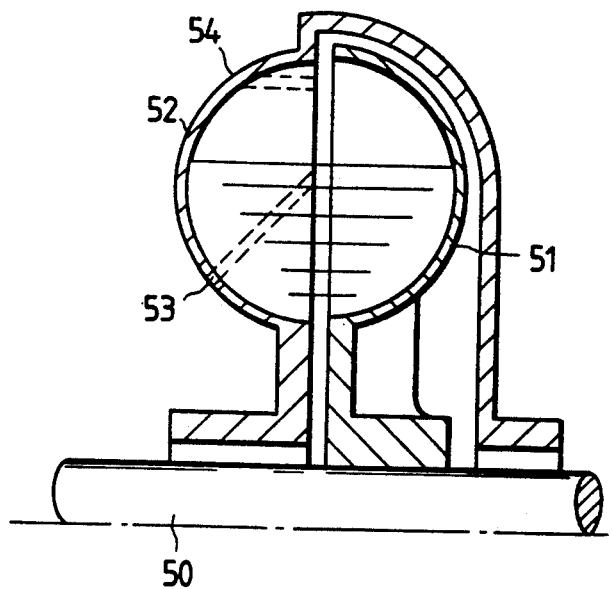
FIG. 3 is a sectional view of a conventional fluid retarder.
Figure 4:
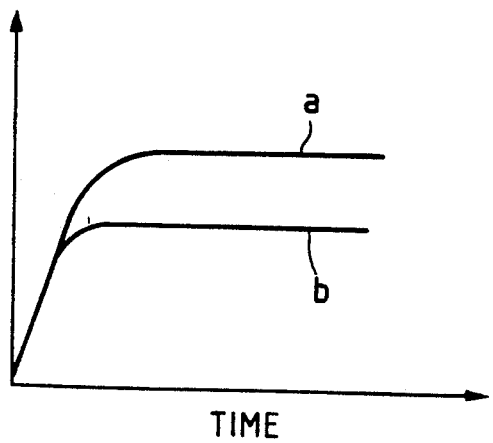
FIG. 4 is a graph showing the relationship between the braking torque generated by the conventional fluid retarder, and time.

At the initial stage of the generation of the braking torque by the retarder 1, the torque sharply rises to a maximum level $A_1$ as shown by a curved line A in FIG. 2. The cause of the sharp rise in the braking torque is that the incompressible working liquid is always stored in the retarder 1 to sharply increase the pressure therein as soon as the start of the action of the retarder. Therefore, the braking torque, which rises more sharply than that by the conventional fluid retarder of the liquid level control type and takes a level higher than the stationary level, is generated immediately after the start of the action of the fluid-storage-type retarder 1.

If the changeover valve 11 is put in the position (b) so that the reservoir tank 10 communicates with the atmosphere through the check valve 20, the braking torque takes a level equal to the stationary level $A_2$, then takes the maximum level $A_1$, and then takes the stationary level a short time after taking the maximum level. The time $t_1$ from the taking of the level equal to the stationary level $A_2$ to the taking of the latter through the taking of the maximum level $A_1$ is set to have a relatively small length of 1 second or less correspondingly to the relatively-low stationary level $A_2$ of the braking torque, by adjusting the properties of the spring 20a of the check valve 20 to set the resistance to the flow therein. Since the vehicle undergoes a relatively high rate of deceleration due to the relatively short time $t_1$, the driver of the vehicle can feel that the retarder 1 is put into action. Since the rate of the deceleration is lower than that of deceleration of the vehicle, which is caused by optionally connecting the restriction valve 17 to the reservoir tank 10 as hereinafter described, the driver can feel that the retarder 1 is put into action to generate the relatively-low stationary level $A_2$ of the braking torque.

The pressure level of about 0.1 kgf/cm$^2$ is set for the other check valve 21 to allow the air flow from the atmosphere to the reservoir tank 10 through the valve to prevent the pressure in the tank from becoming negative.

To cause the fluid-storage-type retarder 1 to generate the relatively-high stationary level of the braking torque, the changeover valve 11 is put in the position (a) by the energized solenoid 11a so that the pressurized air in the air tank 12 is sent into the reservoir tank 10 through the pipe 15 while the pressure of the air is controlled by the pressure regulator 13. The pressurized air sent into the reservoir 10 exerts pressure on the working liquid stored therein, so that the retarder generates the braking torque of the prescribed level corresponding to the pressure of the air. Since the restriction valve 17 by which the pressure in the reservoir tank 10 can be controlled is connected to the pipe 15 through the branch pipe 16, the retarder 1 generates the braking torque depending on the control of the pressure by the restriction valve. At the initial stage of the generation of the braking torque by the retarder 1, the torque sharply rises and takes a maximum level $B_1$ as shown by a curved line B in FIG. 2. The cause of the sharp rise in the braking torque is that the incompressible working liquid is always stored in the retarder 1 to sharply increase the pressure therein as soon as the start of the action of the retarder. The pressure in the reservoir tank 10 increases along with the sharp rise in the braking torque immediately after the pressurized air is sent from the air tank 12 into the reservoir tank. However, since the reservoir tank 10 communicates with the atmosphere through the restriction valve 17 capable of controlling the pressure in the tank, the braking torque which is generated by the retarder 1 and whose level corresponds to the pressure in the reservoir tank takes a level equal to the relatively-high stationary level $B_2$, then takes the maximum level $B_1$, and takes the stationary level a relatively long time after taking the maximum level. The time $t_2$ from the taking of the level equal to the stationary level $B_2$ to the taking of the latter through the taking of the maximum level is set to have a relatively large length of several seconds corresponding to the relatively-high stationary level $B_2$ of the braking torque, by adjusting the restrictor of the restriction valve 17 to set the resistance to the flow therein. Since the maximum level $B_1$ higher than the stationary level $B_2$ is taken by the braking torque during the relatively long time $t_2$ immediately after the start of the action of the retarder 1 so that the vehicle undergoes a relatively high rate of deceleration, the driver can feel that the retarder is put into action to generate the relatively-high stationary level of the braking torque.

A controller provided for the fluid-storage-type retarder of a vehicle in accordance with the present invention functions so that at the initial stage of the start of the action of the retarder, pressure higher than the corresponding one of two or more stationary levels is exerted on a working liquid in a reservoir tank by an air pressure source for a time whose length corresponds to the corresponding stationary level and to the stationary level of the braking torque generated by the retarder. As a result, the driver of the vehicle can precisely feel the start of the action of the retarder and the stationary level of the braking torque. For that reason, the braking operation feeling property of the vehicle and the safety of the movement thereof are enhanced. Practical effects are thus produced.

What is claimed is:

1. A controller for a retarder in a vehicle having a front and rear wheels, said controller comprising:
   a fluid-storage-type retarder having a stator and a rotor, said rotor attached to a rotary shaft which is rotated together with the rear wheels of the vehicle for generating a braking torque, said retarder always storing a fluid;
   a reservoir tank in fluid communication with said retarder;
   means for producing a plurality of stationary levels of pressure in said reservoir tank;
   means for selecting one of said plurality of stationary levels of pressure to be produced in said reservoir tank; and
   pressure regulation means in atmospheric communication with said reservoir tank for imparting a predetermined restriction to pressurized air which flows into said reservoir tank in accordance with the selected stationary level of pressure which is produced in said retarder, wherein said restriction to pressurized air flow causes a pressure in said reservoir tank to be higher than said selected stationary level of pressure for a predetermined period associated with the selected stationary level of pressure starting when said braking torque is initially generated by said retarder.

2. A controller for a retarder according to claim 1, wherein said pressure regulation means comprises a pressurized air source for supplying pressurized air into said reservoir tank to control braking torque.

3. A controller for a retarder according to claim 1, wherein said selecting means includes a changeover valve connected to said reservoir tank and to said producing means.

4. A controller for a retarder according to claim 1, wherein said producing means comprises a plurality of pressure control valves connected to said selecting means.

5. A controller for a retarder according to claim 1, wherein the producing means produces first and second stationary levels of pressure in said reservoir tank, said second stationary level of pressure being greater than said first stationary level of pressure, said pressure regulation means causing a pressure in said reservoir tank to be higher than said first stationary level of pressure, when selected by said selecting means, for a first predetermined period, and said pressure regulation means causing a pressure in said reservoir tank to be higher than said second stationary level of pressure, when selected by said selecting means, for a second predetermined period, said second predetermined period being greater than said first predetermined period.

6. A controller for a retarder in a vehicle having front and rear wheels, said controller comprising:
- a fluid-storage-type retarder always storing a fluid and having a stator and rotor, said rotor attached to a rotary shaft which is rotated together with the rear wheels of the vehicle;
- a reservoir tank connected to said retarder; and
- a pressurized air source for supplying pressurized air into said tank so as to control braking torque, including at least one pair of pressure control valves connected to said tank through a changeover valve to produce one of a plurality of stationary levels of pressure in said tank, wherein the resistance to the flow in each of said pressure control valves is set so that at the initial stage of the generation of said torque by said retarder, pressure higher than the corresponding one of the stationary levels of pressure produced in said retarder, is produced in said tank for a predetermined time associated with the produced stationary level of pressure.

* * * * *